Feb. 1, 1949. A. M. LEZANSKI 2,460,388
SAW SET
Filed Feb. 17, 1947
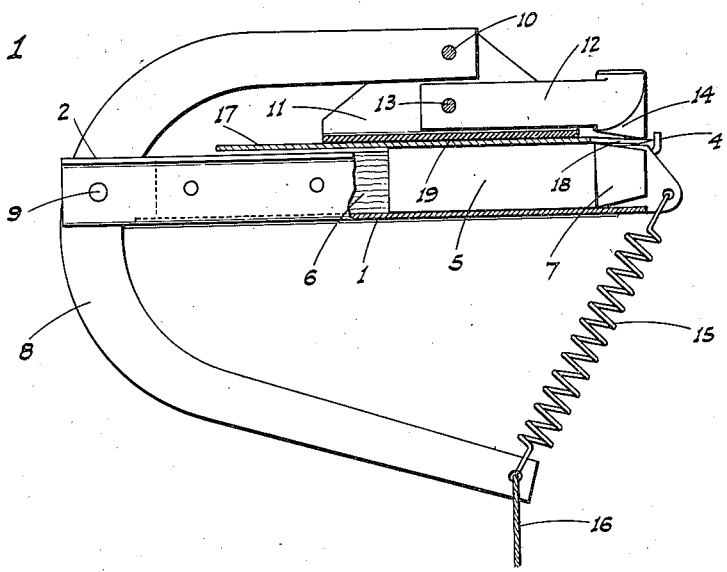
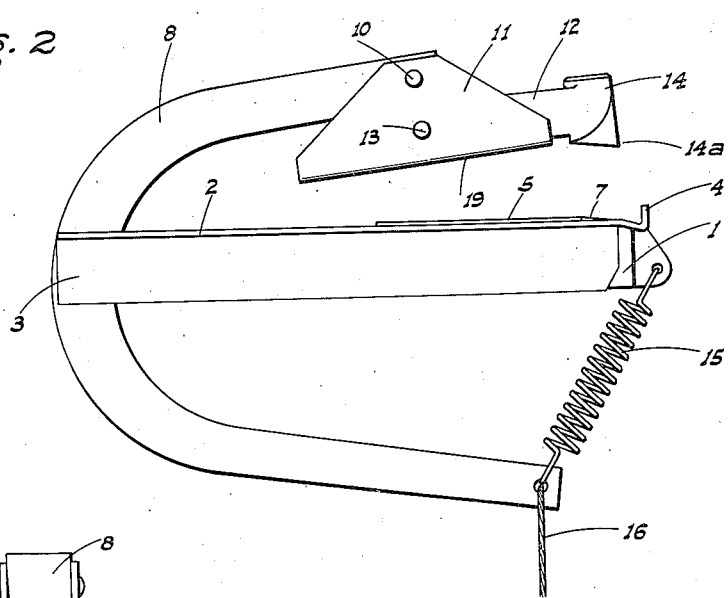
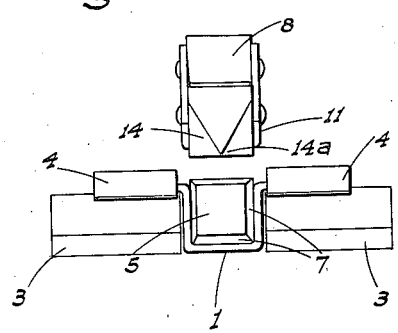
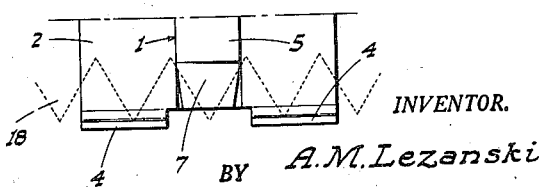
INVENTOR.
A. M. Lezanski
BY
ATTYS Patented Feb. 1, 1949

2,460,388

UNITED STATES PATENT OFFICE 2,460,388

SAW SET

Albert M. Lezanski, Sacramento, Calif.

Application February 17, 1947, Serial No. 729,046

4 Claims. (Cl. 76—65)

This invention relates to, and it is an object to provide, an improved saw set.

Another object of the present invention is to provide a novel saw set for use to set the tooth angle of the teeth of large cross cut saws, such as tree saws or the like.

A further object of the invention is to provide a saw set which includes a novel adjustable anvil arrangement whereby the tooth angle may be predetermined by the setting of such anvil.

An additional object of the invention is to provide a saw set which is operative to readily, conveniently, and accurately set the teeth of large cross cut saws.

A further object is to provide a saw set which sets all teeth to the same angle.

Still another object is to form the striker so that it may be effectively used on relatively small hand saw teeth as well as the teeth of large saws.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings:

Fig. 1 is a sectional elevation of the saw set in use; the C-arm being in lowered position whereby to clamp a saw for a tooth setting operation.

Fig. 2 is a side elevation, but shows the parts of the device in their normal or released positions.

Fig. 3 is a fragmentary front end view of the device.

Fig. 4 is a fragmentary plan view of the device; the saw teeth being shown in dotted lines with one tooth in position for setting.

Referring now more particularly to the characters of reference on the drawings, the improved saw set comprises a horizontal, upwardly opening channel 1 of metal which includes, at the top thereof, laterally outwardly projecting, flat supporting plates 2.

The channel 1 is disposed in snug engagement between a pair of transversely spaced horizontal supporting beams 3 which project from a bench or the like. The flat plates 2 rest on top of corresponding ones of the beams 3 in flat engagement and may be secured thereto; said plates 2 including, at their forward ends, upstanding lips or stops 4.

An elongated anvil 5, which is square in cross section, is frictionally engaged in the channel 1 at the forward portion thereof; there being a back-stop 6 in said channel, intermediate its ends to serve as a locator for the anvil.

At its forward end the anvil 5 is formed with chamfered anvil faces 7, each of which is cut on a different angle. The anvil 5 is removable from the channel 1 so that a selected one of the anvil faces 7 may be disposed uppermost. The outer end of the anvil 5, when in working position, terminates adjacent the transverse plane of the inner faces of the upstanding stops 4, and said anvil, when in working position, normally extends slightly above the top of the flat plates 2, as clearly shown in Fig. 2.

The channel 1 is slotted at its rear end, and a forwardly opening C-arm 8 extends through said slot, and is pivoted, intermediate its ends, as at 9, for vertical swinging motion; the upper portion of said arm overhanging the anvil 5.

At its upper and outer end the C-arm 8 is pivotally secured, as at 10, in connection with a cradle 11 for swinging of said cradle in a longitudinal vertical plane.

A swinging striker 12 is pivoted, at its inner end, as at 13, between the sides of the cradle 11 and projects forwardly to a point ahead thereof; the forward end of said striker including a head 14 disposed in working relation to the uppermost one of the anvil faces 7.

A tension spring 15 connects between the channel 1 and the lower, front end of the C-arm 8. The tension spring 15 normally tends to swing the C-arm 8 in a direction to elevate the cradle 11 and striker 12 to its normal inoperative position of Fig. 2.

The C-arm 8 is adapted to be swung downwardly, against the tension of spring 15, by a pull cord 16 connected to a treadle or the like (not shown).

The bottom of the striker head is flat and slopes down, and is of triangular form, with a central point or apex at its outer end as shown at 14a. By reason of this feature, the striker can be efficiently used on small as well as large teeth.

In operation of the above described device the anvil 5 is first set with a selected one of the anvil faces 7 uppermost. Thereafter, the saw, indicated at 17, is disposed flat across the top of the anvil 5, with the teeth 18 abutting the stops 4, and with one of said teeth directly over said anvil face 7. The foot pedal is then depressed, pulling downwardly on cord 16 and swinging C-arm 8 in a direction to lower the cradle 11 until the flat bottom 19 thereof bears on top of the saw 17 and securely holds it against the top of the anvil 5.

With the parts in this position the head 14 of the swinging striker 12 is in engagement with that one of the saw teeth 18 which is directly over the uppermost anvil face 7. The head 14 is then struck from above by a hand hammer or mallet, causing said head to bend the tooth 18 downwardly to a tooth angle corresponding to the uppermost anvil face 7. This operation is repeated along the edge of the saw on alternate teeth, and then the saw is turned over and the remaining teeth are set in the opposite direction.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A saw set comprising an open ended upwardly opening horizontal channel, means adapted to support the channel, a bar-like anvil engaged in the channel the surface of the anvil projecting just above the top edges of the sides of the channel, an upwardly exposed chamfered face on one side of the anvil at one end thereof, a vertically movable striker mounted above said anvil face in cooperating relation, hold-down means adapted to engage a saw from above and hold the same against the projecting top surfaces of the anvil with one tooth of the saw directly above said chamfered face and below the striker, and saw tooth locating means associated with the channel.

2. A saw set comprising an upwardly opening horizontal channel, side plates projecting laterally outward from the upper edges of the channel, upstanding stops on one end of said plates, a bar-like anvil engaged in the channel, the end of the anvil adjacent the stops having an upwardly facing chamfered face thereon, a forwardly opening C-arm extending above and below the channel from the rear, means pivoting the C-arm intermediate its ends for vertical swinging motion, a transverse pivotally mounted cradle suspended from the upper and forward portion of the C-arm, a vertically swingable striker pivoted in the cradle and projecting to a point ahead thereof, and a head on the free end of the striker disposed in cooperating relation to said anvil face.

3. A saw set comprising an upwardly opening horizontal channel, side plates projecting laterally outward from the upper edges of the channel, upstanding stops on one end of said plates, a bar-like anvil engaged in the channel, the end of the anvil adjacent the stops having an upwardly facing chamfered face thereon, a forwardly opening C-arm extending above and below the channel from the rear, means pivoting the C-arm intermediate its ends for vertical swinging motion, a transverse pivotally mounted cradle suspended from the upper and forward portion of the C-arm, a vertically swingable striker pivoted in the cradle and projecting to a point ahead thereof, and a head on the free end of the striker disposed in cooperating relation to said anvil face; there being a spring urging said arm to a raised position with the striker clear of the anvil face.

4. A saw set comprising an upwardly opening horizontal channel, side plates projecting laterally outward from the upper edges of the channel, upstanding stops on one end of said plates, a bar-like anvil engaged in the channel, the end of the anvil adjacent the stops having an upwardly facing chamfered face thereon, a forwardly opening C-arm extending above and below the channel from the rear, means pivoting the C-arm intermediate its ends for vertical swinging motion, a transverse pivotally mounted cradle suspended from the upper and forward portion of the C-arm, a vertically swingable striker pivoted in the cradle and projecting to a point ahead thereof, and a head on the free end of the striker disposed in cooperating relation to said anvil face; the bottom of the cradle being flat and forming a saw hold-down member, and said bottom limiting relative downward swinging of the striker.

ALBERT M. LEZANSKI.

REFERENCES CITED

The following references are of record in the file of this patent:

UNITED STATES PATENTS

| Number | Name | Date |
|---|---|---|
| 346,944 | Poindexter | Aug. 10, 1886 |
| 377,853 | Hargrave | Feb. 14, 1888 |
| 986,693 | Conklin | Mar. 14, 1911 |
| 1,005,688 | Burnham | Oct. 10, 1911 |
| 1,029,614 | Johnson | June 18, 1912 |
| 1,088,941 | Swainston | Mar. 3, 1914 |
| 1,374,279 | Byrnes et al. | Apr. 12, 1921 |
| 1,913,534 | Clemson | June 13, 1933 |
| 2,289,114 | Frizzell | July 7, 1942 |
| 2,336,761 | Upright | Dec. 14, 1943 |
| 2,401,264 | Murray | May 28, 1946 |
| 2,432,269 | Andrus | Dec. 9, 1947 |